United States Patent
Kim et al.

(10) Patent No.: US 12,488,941 B2
(45) Date of Patent: *Dec. 2, 2025

(54) DIELECTRIC CERAMIC COMPOSITION AND MULTILAYER CERAMIC CAPACITOR COMPRISING SAME

(71) Applicant: SAMSUNG ELECTRO-MECHANICS CO., LTD., Suwon-si (KR)

(72) Inventors: Kyung Sik Kim, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 212 days.

This patent is subject to a terminal disclaimer.

(21) Appl. No.: 18/228,050

(22) Filed: Jul. 31, 2023

(65) Prior Publication Data

US 2023/0386743 A1 Nov. 30, 2023

Related U.S. Application Data

(63) Continuation of application No. 17/546,390, filed on Dec. 9, 2021, now Pat. No. 11,763,990, which is a (Continued)

(30) Foreign Application Priority Data

Jun. 17, 2019 (KR) .................. 10-2019-0071717

(51) Int. Cl.
*H01G 4/12* (2006.01)
*C04B 35/468* (2006.01)
(Continued)

(52) U.S. Cl.
CPC ....... *H01G 4/1227* (2013.01); *C04B 35/4682* (2013.01); *H01G 4/012* (2013.01);
(Continued)

(58) Field of Classification Search
CPC ........ H01G 4/1227; H01G 4/012; H01G 4/10; H01G 4/232; H01G 4/248; H01G 4/30;
(Continued)

(56) References Cited

U.S. PATENT DOCUMENTS

| 6,356,037 B1 | 3/2002 | Sano et al. |
| 10,618,846 B2 | 4/2020 | Okamoto |

(Continued)

FOREIGN PATENT DOCUMENTS

| CN | 1801417 A | 7/2006 |
| CN | 105377793 A | 3/2016 |

(Continued)

OTHER PUBLICATIONS

Office Action dated May 21, 2024, issued in corresponding Japanese Patent Application No. 2020-100042 with an English translation (8 pages).

(Continued)

*Primary Examiner* — Michael P Mcfadden
(74) *Attorney, Agent, or Firm* — MORGAN, LEWIS & BOCKIUS LLP (57) ABSTRACT

A dielectric ceramic composition and a multilayer ceramic capacitor including the same are provided, the dielectric ceramic composition includes a $BaTiO_3$-based base material main component and a subcomponent, wherein the subcomponent includes zinc oxide (ZnO) as a first subcomponent, and the content of the ZnO is 0.1 mol % or more and less than 0.4 mol % with respect to 100 mol % of the base material main component.

16 Claims, 3 Drawing Sheets

Related U.S. Application Data continuation of application No. 16/781,595, filed on Feb. 4, 2020, now Pat. No. 11,227,717.

(51) Int. Cl.

| | | |
|---|---|---|
| *H01G 4/012* | (2006.01) | |
| *H01G 4/10* | (2006.01) | |
| *H01G 4/232* | (2006.01) | |
| *H01G 4/248* | (2006.01) | |
| *H01G 4/30* | (2006.01) | |

(52) U.S. Cl.
CPC .............. *H01G 4/10* (2013.01); *H01G 4/232* (2013.01); *H01G 4/248* (2013.01); *H01G 4/30* (2013.01); *C04B 2235/3206* (2013.01); *C04B 2235/3236* (2013.01); *C04B 2235/3284* (2013.01); *C04B 2235/768* (2013.01); *C04B 2235/85* (2013.01)

(58) Field of Classification Search
CPC ........ C04B 35/4682; C04B 2235/3206; C04B 2235/3236; C04B 2235/3284; C04B 2235/768; C04B 2235/85
See application file for complete search history.

(56) References Cited

U.S. PATENT DOCUMENTS

| | | | |
|---|---|---|---|
| 11,227,717 B2 | 1/2022 | Kim | |
| 11,763,990 B2* | 9/2023 | Kim | H01G 4/10 501/137 |
| 2001/0035563 A1* | 11/2001 | Masumiya | C04B 35/4682 257/532 |
| 2006/0198078 A1* | 9/2006 | Miyauchi | H01G 4/008 361/305 |
| 2006/0232910 A1* | 10/2006 | Megherhi | H01G 4/30 361/321.4 |
| 2010/0035748 A1 | 2/2010 | Umeda et al. | |
| 2012/0147524 A1 | 6/2012 | Okamoto et al. | |
| 2014/0022698 A1 | 1/2014 | Jeong et al. | |
| 2016/0049256 A1* | 2/2016 | Kitano | H01G 4/1209 361/301.4 |
| 2016/0118188 A1 | 4/2016 | Wada | |
| 2017/0186543 A1 | 6/2017 | Park et al. | |
| 2018/0130601 A1 | 5/2018 | Kim et al. | |
| 2018/0182549 A1* | 6/2018 | Koide | C04B 35/638 |
| 2018/0265413 A1* | 9/2018 | Okamoto | H01G 4/30 |

FOREIGN PATENT DOCUMENTS

| | | |
|---|---|---|
| CN | 106915959 A | 7/2017 |
| CN | 108063051 A | 5/2018 |
| JP | S48-35400 | 5/1973 |
| JP | 50-100600 | 8/1975 |
| JP | H02-044061 A | 2/1990 |
| JP | 7-315920 A | 12/1995 |
| JP | 7-315921 A | 12/1995 |
| JP | H08-119728 A | 5/1996 |
| JP | H09-071456 A | 3/1997 |
| JP | H09-241070 A | 9/1997 |
| JP | 10-025157 A | 1/1998 |
| JP | H10-045468 A | 2/1998 |
| JP | 11-297563 A | 10/1999 |
| JP | 2001-089231 A | 4/2001 |
| JP | 2009-209034 A | 9/2009 |
| JP | 2014-22714 A | 2/2014 |
| KR | 10-2018-0067631 A | 6/2018 |
| WO | 2011/027625 A1 | 3/2011 |
| WO | 2017/094882 A1 | 6/2017 |

OTHER PUBLICATIONS

Office Action issued in corresponding Chinese Patent Application No. 202210398373.3 dated Mar. 28, 2024, with English translation.
Notice of Allowance issued in corresponding U.S. Appl. No. 17/546,390 dated May 3, 2023.
Office Action issued in corresponding U.S. Appl. No. 17/546,390 dated Feb. 10, 2023.
Office Action issued in corresponding Chinese Patent Application No. 202010259098.8 dated Mar. 29, 2023, with English translation.
Chinese Office Action dated Sep. 27, 2022, issued in corresponding Chinese Patent Application No. 202010259098.8, with English translation.
Notice of Allowance issued in corresponding U.S. Appl. No. 16/781,595 dated Sep. 29, 2021.
Office Action issued in corresponding U.S. Appl. No. 16/781,595 dated Jul. 14, 2021.
Office Action issued in corresponding Korean Patent Application No. 10-2019-0071717 on Jan. 4, 2024, with English translation.
Office Action issued Nov. 7, 2023 for counterpart Japanese Patent Application No. 2020-100042 (See English Translation).

\* cited by examiner

DIELECTRIC CERAMIC COMPOSITION AND MULTILAYER CERAMIC CAPACITOR COMPRISING SAME

CROSS-REFERENCE TO RELATED APPLICATION(S)

This application is the continuation application of U.S. patent application Ser. No. 17/546,390 filed on Dec. 9, 2021, which is the continuation application of U.S. patent application Ser. No. 16/781,595 filed on Feb. 4, 2020, now U.S. Pat. No. 11,227,717 issued on Jan. 18, 2022, which claims benefit of priority to Korean Patent Application No. 10-2019-0071717 filed on Jun. 17, 2019 in the Korean Intellectual Property Office, the disclosures of which are incorporated herein by reference in their entirety.

BACKGROUND

1. Technical Field

The present disclosure relates to a dielectric ceramic composition capable of improving reliability, and a multilayer ceramic capacitor including the same.

2. Description of Related Art

In general, electronic components using a ceramic material such as capacitors, inductors, piezoelectric elements, varistors, thermistors, or the like, include a ceramic body formed of a ceramic material, an internal electrode formed in a body, and an external electrode disposed on a surface of the ceramic body to be connected to the internal electrode.

In recent years, due to the trend of miniaturization and multifunctionalization of electronic products, chip components have had the tendency to be miniaturized and implemented with high functionality. Therefore, multilayer ceramic capacitors are required to be high-capacity products having a small size and high capacity.

As a method for achieving both of miniaturization and high capacity of a multilayer ceramic capacitor, a thickness of a dielectric layer and an electrode layer therein is reduced to allow a larger number of layers to be stacked. In this regard, a thickness of a recent dielectric layer is on a level of about 0.6 µm, and the development is proceeding to a thin level continuously.

In this situation, it may be important to ensure the reliability of a dielectric layer regarding a dielectric material.

Moreover, a large electric field per unit thickness is applied to a dielectric layer having a thin film, there is a problem in that it is sensitive to changes in temperature, and it is difficult to implement effective capacitance and temperature characteristics under actual use conditions.

Therefore, in order to solve such a problem, it is necessary to develop a dielectric material having a small change in permittivity due to an external electric field (DC) and a temperature change.

SUMMARY

An aspect of the present disclosure is to provide a dielectric ceramic composition capable of improving reliability, and a multilayer ceramic capacitor including the same.

According to an aspect of the present disclosure, a dielectric ceramic composition includes a barium titanate (BaTiO$_3$)-based base material main component and a subcomponent, the subcomponent includes zinc oxide (ZnO) as a first subcomponent, and the content of the ZnO is 0.1 mol % or more and less than 0.4 mol % based on 100 mol % of the base material main component.

According to another aspect of the present disclosure, a multilayer ceramic capacitor includes a ceramic body including a dielectric layer, and a first internal electrode and a second internal electrode, disposed to oppose each other with the dielectric layer interposed therebetween, and a first external electrode and a second external electrode, disposed on an exterior of the ceramic body, the first external electrode being electrically connected to the first internal electrode and the second external electrode being electrically connected to the second internal electrode, the dielectric layer includes a dielectric grain including a dielectric ceramic composition, the dielectric ceramic composition includes a BaTiO$_3$-based base material main component (base material main component) and a subcomponent, the subcomponent includes zinc oxide (ZnO) as a first subcomponent, and the content of the ZnO is 0.1 mol % or more and less than 0.4 mol % with respect to 100 mol % of the base material main component.

Other features and aspects will be apparent from the following detailed description, the drawings, and the claims.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and only a required configuration is propose herein, but the present disclosure is not limited thereto.

Figure 1:
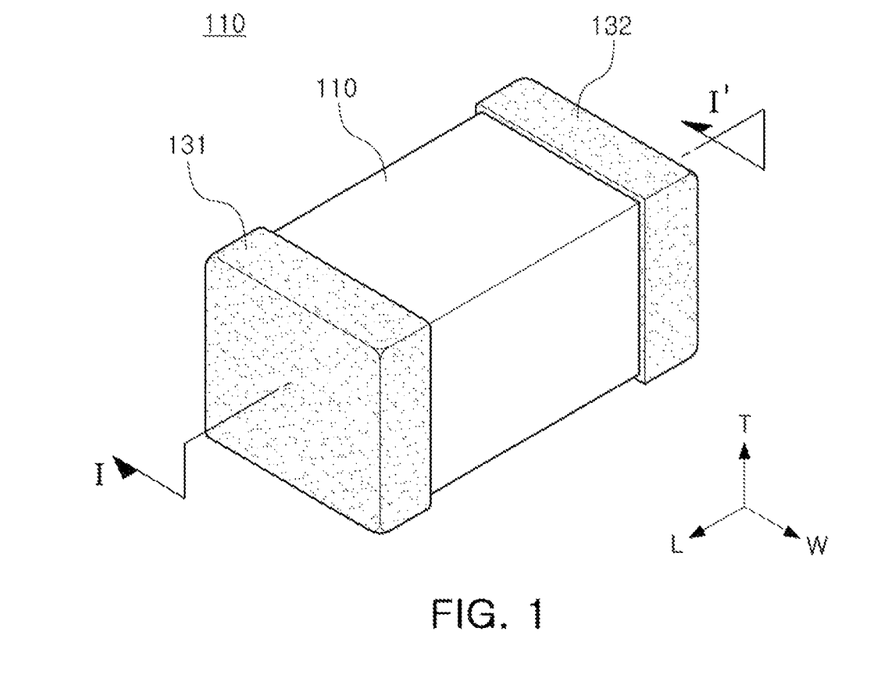
FIG. 1 is a schematic perspective view illustrating a multilayer ceramic capacitor according to an embodiment.

FIG. 1 is a schematic perspective view illustrating a multilayer ceramic capacitor according to an embodiment.

Figure 2:
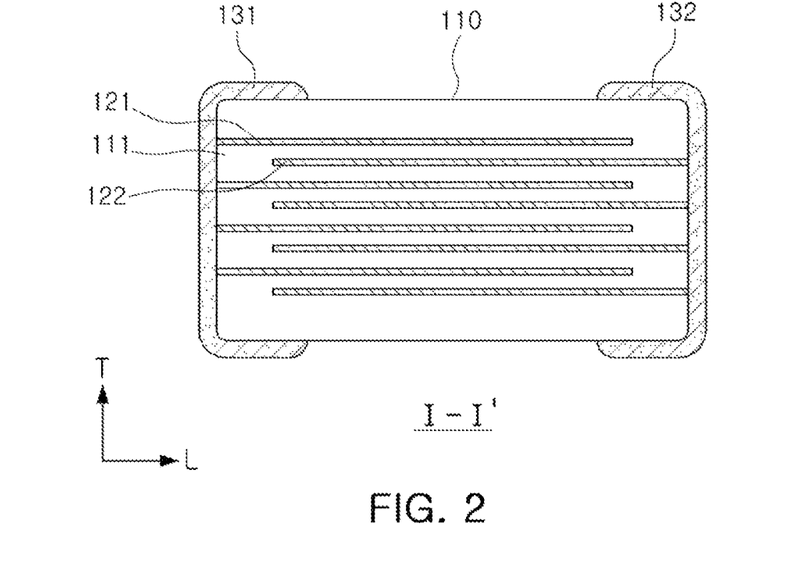
FIG. 2 is a cross-sectional view taken along line I-I' of FIG. 1.

FIG. 2 is a cross-sectional view taken along line I-I' of FIG. 1.

Referring to FIGS. 1 and 2, a multilayer ceramic capacitor 100 according to an embodiment includes a ceramic body 110 including a dielectric layer 111, a first internal electrode 121 and a second internal electrode 122, disposed to oppose each other with the dielectric layer 111 interposed therebetween, and a first external electrode 131 and a second external electrode 132, disposed on an exterior of the ceramic body 110, the first external electrode 131 being electrically connected to the first internal electrode 121 and the second external electrode 132 being electrically connected to the second internal electrode 122.

In the multilayer ceramic capacitor 100 according to an embodiment, a "longitudinal direction" is defined as an "L" direction in FIG. 1, a "width direction" is defined as a "W" direction, and a "thickness direction" is defined as a "T" direction. Here, the "thickness direction" may be used in the same sense as a direction in which dielectric layers are stacked, that is, a "stacking direction."

A form of the ceramic body 110 is not particularly limited, but the ceramic body may have a hexahedral form as illustrated in the drawings.

One end of each of a plurality of internal electrodes 121 and 122, formed inside the ceramic body 110, is exposed to one end of the ceramic body 110 or the other end opposing the one end.

The internal electrodes 121 and 122 may be provided as pairs of internal electrodes, including a first internal electrode 121 and a second internal electrode 122, having different polarities.

One end of the first internal electrode 121 is exposed to one end of a ceramic body, and one end of the second internal electrode 122 is exposed to the other end opposing the one end.

First and second external electrodes 131 and 132 are formed on one end of the ceramic body 110 and the other end, opposing the one end, to be electrically connected to the internal electrode.

Here, a material, forming the first and second internal electrodes 121 and 122, is not particularly limited. For example, the first and second internal electrodes 121 and 122 may be formed using a conductive paste containing at least one element selected from the group consisting of silver (Ag), lead (Pb), platinum (Pt), nickel (Ni), and copper (Cu).

The first and second external electrodes 131 and 132 may be electrically connected to the first and second internal electrodes 121 and 122 for capacitance formation, and the second external electrode 132 may be connected to a potential different from that of the first external electrode 131.

A conductive material, included in the first external electrode 131 and the second external electrode 132, is not particularly limited, but may comprise nickel (Ni), copper (Cu), or alloys thereof.

Thicknesses of the first and second external electrodes 131 and 132 may be appropriately determined depending on the intended application thereof, and the like, and are not particularly limited, but may be 10 µm to 50 µm, by way of example.

According to an embodiment, a raw material of the dielectric layer 111 is not particularly limited as long as sufficient capacitance may be obtained therewith. For example, the raw material of the dielectric layer 111 may be barium titanate ($BaTiO_3$) powders.

A material of the dielectric layer 111 may be prepared by adding various additives, organic solvents, plasticizers, binders, dispersing agents, and the like, to powders such as the barium titanate ($BaTiO_3$) powders, or the like, according to an object of the present disclosure.

The dielectric layer 111 is sintered, so boundaries between adjacent dielectric layers may be integrated and may not be readily identifiable.

The first and second internal electrodes 121 and 122 may be formed on the dielectric layer 111, and the internal electrodes 121 and 122 may be formed in the ceramic body with a dielectric layer interposed therebetween by sintering.

A thickness of the dielectric layer 111 may be arbitrarily changed according to the capacitance design of a capacitor. In an embodiment, the thickness of the dielectric layer after sintering may preferably be 0.4 µm or less per layer.

Moreover, a thickness of each of the first and second internal electrodes 121 and 122 after sintering may preferably be 0.4 μm or less per layer.

According to an embodiment of the present disclosure, the dielectric layer 111 includes a dielectric grain including a dielectric ceramic composition, and the dielectric ceramic composition includes a $BaTiO_3$-based base material main component (base material main component) and a subcomponent, the subcomponent includes zinc oxide (ZnO) as a first subcomponent, and the content of the zinc oxide (ZnO) in the dielectric ceramic composition is satisfied with 0.1 mol % or more and less than 0.4 mol % of a main component to 100 mol % of the base material main component.

In general, it is necessary to suppress the grain growth of the dielectric material which is accompanied by sintering in order to decrease the effective capacity change rate and ensure temperature stability in a high frequency low electric field environment.

In order to suppress grain growth of a ceramic material, a drag effect caused by the grain boundary segregation is used. When the drag effect occurs, mobility of a dielectric grain at a boundary is reduced to suppress grain growth. Thus, in an embodiment, as an additive capable of inducing a drag effect, zinc oxide (ZnO) is added to suppress the grain growth, but the content of ZnO is controlled. As a result, a reduction in an effective capacity change rate and improvement of reliability under the direct current (DC) electric field may be implemented.

In general, a size of a zinc (Zn) ion is relatively small, and thus the Zn ion is suitable to be substituted at a B site in a perovskite structure such as $ABO_3$.

However, a valency of Zn is lower than that of titanium (Ti), and thus Zn is difficult to be actually dissolved.

The Zn ion has a valency of +2, and is preferably substituted to a barium (Ba) site having a valency of +2, that is, A site in a perovskite structure such as $ABO_3$, in terms of a low valency. In this case, since a size mismatch with Ba having a large ion size is large, a solid solution limit is significantly low.

Thus, when zinc oxide (ZnO) is added, most of ZnO is not dissolved in a lattice, but is segregated in a grain boundary in the form of ZnO. ZnO, segregated in a grain boundary as described above, induces a drag effect, interfering with the movement of a grain boundary during the grain growth, and thus suppresses grain growth of a ceramic material.

When the grain growth of the ceramic material is suppressed, a width of a domain wall in a dielectric grain is reduced, and thus mobility of a domain wall under a high frequency low electric field is increased.

In this regard, an increase in DC effective capacity under a high frequency low electric field DC may be caused. In addition, as a size of a domain is reduced, the room temperature nominal capacity is reduced. Moreover, as a ratio of a shell portion of a dielectric grain of a core-shell structure is reduced, temperature stability can be improved.

According to an embodiment, the dielectric ceramic composition includes a $BaTiO_3$-based base material main component (base material main component) and a subcomponent, the subcomponent includes ZnO as a first subcomponent, and the content of the ZnO is satisfied with 0.1 mol % or more and less than 0.4 mol % based on 100 mol % of the base material main component, so the grain growth inhibition and low temperature densification may be implemented. Thus, the effective capacity change rate may be reduced and reliability may be improved under the DC electric field.

If the content of the ZnO in the dielectric ceramic composition is less than 0.1 mol % with respect to 100 mol % of the base material main component, the content of ZnO is low, so a grain growth inhibition effect is significantly low.

Meanwhile, if the content of the ZnO in the dielectric ceramic composition is 0.4 mol % or more with respect to 100 mol % of the base material main component, a large amount of ZnO having semiconductor characteristics is segregated in a dielectric grain boundary, so resistance of a grain boundary is lowered, and reliability may be reduced.

If the content of ZnO in the dielectric ceramic composition is satisfied with 0.1 mol % or more and less than 0.4 mol % to 100 mol % of the base material main component, densification of a dielectric material appears at a temperature in which a sintering temperature is lowered by 20° C., as compared with the same model, and it is confirmed that a significant grain growth inhibition effect is obtained.

Meanwhile, according to an embodiment, the subcomponent includes magnesium (Mg) as a second subcomponent, and the total content of zinc oxide (ZnO) and magnesium (Mg) may be less than 0.8 mol % with respect to 100 mol % of the base material main component.

As the total content of zinc oxide (ZnO) and magnesium (Mg) in the dielectric ceramic composition is increased, it is advantageous in terms of reliability improvement. However, semiconductor characteristics may be provided at a certain amount or more to deteriorate characteristics of an insulator and to deteriorate sintering properties. Thus, it is preferable that the total content of zinc oxide (ZnO) and magnesium (Mg) in the dielectric ceramic composition is less than 0.8 mol % with respect to 100 mol % of the base material main component.

That is, if the total content of the zinc oxide (ZnO) and the magnesium (Mg) in the dielectric ceramic composition is 0.8 mol % or more based on 100 mol % of the base material main component, due to the excessive content, sintering properties may be insufficient. Thus, there may be a problem in the reliability such as the capacity uncertainty, the breakdown voltage (BDV) decrease, or the like.

The multilayer ceramic capacitor 100 according to an embodiment is a super small high capacity product as described above. Here, a thickness of the dielectric layer 111 is 0.4 μm or less, and a thickness of each of the first and second internal electrodes 121 and 122 is 0.4 μm or less, but an embodiment is not limited thereto.

Moreover, a size of the multilayer ceramic capacitor 100 may be 1005 (length×width, 1.0 mm×0.5 mm) or less.

That is, since the multilayer ceramic capacitor 100 according to an embodiment is a super small high capacity product, each of the dielectric layer 111 as well as the first and second internal electrodes 121 and 122 is composed of a thin film in which a thickness thereof is reduced as compared to a product according to the related art. In the case of a product of the multilayer ceramic capacitor, to which a dielectric layer and an internal electrode, composed of a thin film, are applied, as described above, research on a reduction in an effective capacity change rate and improvement of reliability under a DC electric field is a significantly important issue.

That is, in the case of the multilayer ceramic capacitor according to the related art, a relatively great thickness is provided, as compared with a dielectric layer and an internal electrode included in a multilayer ceramic capacitor according to an embodiment. Thus, even when a composition of a dielectric ceramic is the same as that according to the related art, reliability is not significantly considered.

However, in the case of a product in which a dielectric layer and an internal electrode, composed of a thin film, as in an embodiment, a reduction in an effective capacity change rate and improvements of reliability under a DC electric field of a multilayer ceramic capacitor are significant. To this end, a dielectric ceramic composition is required to be controlled.

That is, in an embodiment, the content of the ZnO in the dielectric ceramic composition is controlled to satisfy 0.1 mol % or more and less than 0.4 mol % with respect to 100 mol % of the base material main component. In detail, the total content of zinc oxide (ZnO) and magnesium (Mg) in the dielectric ceramic composition is controlled to be less than 0.8 mol % with respect to 100 mol % of the base material main component. Thus, in the case of a thin film with the dielectric layer 111 having a thickness of 0.4 μm or less, grain growth inhibition and low temperature densification may be implemented. The total content of ZnO and Mg in the dielectric ceramic composition is more than 0.0 mol % with respect to 100 mol % of the base material main component. Thus, an effective capacity change rate may be reduced and reliability may be improved under a DC electric field.

Here, the meaning of the thin film is not that a thickness of the dielectric layer 111 and each of the first and second internal electrodes 121 and 122 is 0.4 μm or less, and may be understood as the concept of including the dielectric layer and the internal electrode, having a reduced thickness, as compared with the product according to the related art.

Hereinafter, each component of a dielectric ceramic composition according to an embodiment will be described more specifically.

a) Base Material Main Component

A dielectric ceramic composition according to an embodiment may include a base material main component, represented by $BaTiO_3$.

According to an embodiment of the present disclosure, the base material main component includes one or more selected from the group consisting of $BaTiO_3$, $(Ba_{1-x}Ca_x)(Ti_{1-y}Ca_y)O_3$ (here, x is $0 \leq x \leq 0.3$, and y is $0 \leq y \leq 0.1$), $(Ba_{1-x}Ca_x)(Ti_{1-y}Zr_y)O_3$ (here, x is $0 \leq x \leq 0.3$, y is $0 \leq y \leq 0.5$), and $Ba(Ti_{1-y}Zr_y)O_3$ (here, $0 < y \leq 0.5$), but it is not necessarily limited thereto.

Room temperature permittivity of the dielectric ceramic composition according to an embodiment may be 2000 or more.

The base material main component is not particularly limited, but an average particle diameter of a powder form of the base material main component may be 40 nm or more and 200 nm or less.

b) First Subcomponent

According to an embodiment of the present disclosure, the dielectric ceramic composition may include one or more oxides including at least one element selected from the group consisting of Manganese (Mn), vanadium (V), chromium (Cr), iron (Fe), nickel (Ni), cobalt (Co), copper (Cu) and zinc (Zn) and/or one or more carbonates including at least one element selected from the group consisting of Mn, V, Cr, Fe, Ni, Co, Cu and Zn, as a first subcomponent.

As the first subcomponent, a total amount of the oxides including at least one element selected from the group consisting of Mn, V, Cr, Fe, Ni, Co, Cu and Zn and the carbonates including at least one element selected from the group consisting of Mn, V, Cr, Fe, Ni, Co, Cu and Zn in the dielectric ceramic composition may be included in the content of 0.1 mol % to 2.0 mol %, inclusive, with respect to 100 mol % of the base material main component. The total amount of the first subcomponent in the dielectric ceramic composition of the present disclosure may be the total amount of the first subcomponent in the dielectric layer 111.

The first subcomponent may serve to reduce a sintering temperature of a multilayer ceramic capacitor, to which a dielectric ceramic composition is applied, and to improve high-temperature withstand voltage characteristics.

The content of the first subcomponent and the contents of the second to fourth subcomponents refer to an included amount with respect to 100 mol % of base material powder, and particularly, may be defined as mol % of a metal ion included in each subcomponent.

If the content of the first subcomponent in the dielectric ceramic composition is less than 0.1 mol %, a sintering temperature increases, and high-temperature withstand voltage characteristics may be rather reduced.

If the content of the first subcomponent exceeds 2.0 mol %, high-temperature withstand voltage characteristics and room temperature resistivity may be lowered.

In detail, a dielectric ceramic composition according to an embodiment may include a first subcomponent having the content of 0.1 mol % to 2.0 mol %, inclusive, with respect to 100 mol % of a base material main component. In this regard, low-temperature sintering may be performed, and a high degree of high-temperature withstand voltage characteristics may be obtained.

c) Second Subcomponent

According to an embodiment, the dielectric ceramic composition may include a second subcomponent, an oxide and/or a carbonate, including a fixed-valence acceptor element magnesium (Mg).

The fixed-valence acceptor element Mg may be included in the dielectric ceramic composition in an amount of 0.2 mol % to 0.7 mol %, inclusive, as a second subcomponent, with respect to 100 mol % of the base material main component.

The second subcomponent is a fixed-valence acceptor element and compounds including the same, and serves as an acceptor to reduce electron concentration. The fixed-valence acceptor element Mg, the second subcomponent, is included in the dielectric ceramic composition in an amount of 0.2 mol % to 0.7 mol %, inclusive, with respect to 100 mol % of the base material main component, and thus a reliability improvement effect due to n-type may be significantly increased. The total amount of the second subcomponent of the present disclosure may be the total amount of the second subcomponent included in the dielectric layer 111.

If the content of the second subcomponent in the dielectric ceramic composition exceeds 0.7 mol %, with respect to 100 mol % of the base material main component, permittivity may be lowered, and a dielectric breakdown voltage (BDV) may be lowered. Thus, the excessive content of the second subcomponent is not preferable.

d) Third Subcomponent

According to an embodiment of the present disclosure, the dielectric ceramic composition may include one or more oxides including at least one of silicon (Si) or aluminum (Al), or a glass compound including Si, as a third subcomponent.

The dielectric ceramic composition may further include 0.5 mol % or less and more than 0.0 mol % of a third subcomponent, which includes one or more oxides including at least one of Si or Al, or a glass compound including Si, with respect to 100 mol % of the base material main component.

The content of the third subcomponent may be the content of the elements of Si and Al included in the dielectric ceramic composition as the third subcomponent with respect to 100 mol % of the third subcomponent, without regard to an addition form such as glass, oxides, or carbonates including elements of Si and Al. The content of the third subcomponent of the present disclosure may be the content of the third subcomponent included in the dielectric layer 111.

The third subcomponent may serve to reduce a sintering temperature of a multilayer ceramic capacitor, to which a dielectric ceramic composition is applied, and to improve high-temperature withstand voltage characteristics.

If the content of the third subcomponent in the dielectric ceramic composition exceeds 0.5 mol % with respect to 100 mol % of the base material main component, sintering properties and compactness may be reduced and a secondary phase may be generated. Thus, the excessive content of the third subcomponent is not preferable.

In detail, according to an embodiment of the present disclosure, the dielectric ceramic composition includes Al in a content of 0.5 mol % or less. Thus, as Al acts as an acceptor, the electron concentration is rather reduced, so reliability may be improved.

e) Fourth Subcomponent

According to an embodiment of the present disclosure, the dielectric ceramic composition may include 0.001 mol % to 4.0 mol %, inclusive, of a fourth subcomponent including one or more oxides including at least one element selected from the group consisting of dysprosium (Dy), yttrium (Y), holmium (Ho), erbium (Er), cerium (Ce), neodymium (Nd), promethium (Pm), europium (Eu), gadolinium (Gd), thulium (Tm), ytterbium (Yb), lutetium (Lu), lanthanum (La), and samarium (Sm) and/or one or more carbonates including at least one element selected from the group consisting of Dy, Y, Ho, Er, Ce, Nd, Pm, Eu, Gd, Tm, Yb, Lu, La and Sm, with respect to 100 mol % of the base material main component. The content of the fourth subcomponent of the present disclosure may be the content of the fourth subcomponent included in the dielectric layer 111.

The fourth subcomponent serves to prevent reliability of a multilayer ceramic capacitor, to which a dielectric ceramic composition is applied, from being reduced, in an embodiment.

If the content of the fourth subcomponent in the dielectric ceramic composition exceeds 4.0 mol %, reliability may be lowered, the permittivity of the dielectric ceramic composition may be lowered, and high-temperature withstand voltage characteristics may be deteriorated.

In detail, according to an embodiment of the present disclosure, lanthanum (La) of the fourth subcomponent may be disposed at a grain boundary of the dielectric grain.

Meanwhile, when a rare earth element having an ionic radius larger than that of dysprosium (Dy), for example, lanthanum (La), is used, a site of barium (Ba) may be more effectively substituted. In this regard, the oxygen vacancy defect concentration may be more effectively reduced.

Thus, lanthanum (La) may be further included as a fourth subcomponent, in order to secure insulation resistance, while the oxygen vacancy defect concentration is significantly reduced to improve reliability.

Here, if the content of lanthanum (La) in the dielectric ceramic composition is excessive, due to an excessive degree of semiconductor characteristics, insulation resistance may be rapidly lowered. In this regard, the content of La in the dielectric ceramic composition is preferably included in an amount of 0.233 mol % or more and 0.699 mol % or less with respect to 100 mol % of the base material main component.

If the content of lanthanum (La) in the dielectric ceramic composition is less than 0.233 mol %, permittivity may not be improved. If the content of La in the dielectric ceramic composition exceeds 0.699 mol %, the insulation resistance may be lowered or dielectric loss (that is, a dissipation factor (Df)) may be lowered.

Hereinafter, the present disclosure will be described in more detail with reference to an Example and a Comparative Example. However, the Example and the Comparative Example are provided to help the specific understanding of the present disclosure, and a range according to an embodiment of the present disclosure is not limited thereto.

EXAMPLE

In an Example, an organic solvent, for example, an additive such as Dy, Al, Mg, Zn, or the like, a binder, and ethanol was added to dielectric material powder including barium titanate ($BaTiO_3$)-based base material main component (base material main component) in a powder form, and wet-mixed to prepare dielectric slurry. Then, the dielectric slurry was applied on a carrier film to be dried, so a ceramic green sheet was provided. Through the process described above, a dielectric layer may be formed.

In this case, while a particle size of the additive of all elements is 40% or less as compared to that of barium titanate added as the based base material main component, monodispersion and input were performed.

In an embodiment, the content of the ZnO in the dielectric slurry (i.e, the total content of ZnO in the dielectric composition) was 0.1 mol % or more and less than 0.4 mol % with respect to 100 mol % of the base material main component. In detail, in Examples 1 and 2, the total content of zinc oxide (ZnO) and magnesium (Mg) was less than 0.8 mol % with respect to 100 mol % of the base material main component.

In an Example 1, ZnO was added to the dielectric slurry to adjust the content of the ZnO to be 0.1 mol % with respect to 100 mol % of the base material main component.

In an Example 2, ZnO was added to the dielectric slurry to adjust the content of the ZnO to be 0.2 mol % with respect to 100 mol % of the base material main component.

Regarding a ceramic green sheet, a ceramic powder, a binder, and a solvent were mixed to prepare slurry, and the slurry was manufactured as a sheet having a thickness of several μm using a doctor blade method.

Then, a conductive paste for an internal electrode, in which an average size of nickel particles is 0.1 μm to 0.2 μm and 40 to 50 parts by weight of nickel powder is included, was provided.

A conductive paste for an internal electrode was applied onto the green sheet using a screen-printing method to form an internal electrode. Then, a green sheet, in which an internal electrode pattern was disposed, was stacked to form a stacked body, and then the stacked body was pressed and cut.

Then, the cut stacked body was heated to remove a binder, and then sintering was performed at a high-temperature in a reducing atmosphere to form a ceramic body.

In the sintering process, sintering was performed for 2 hours at a temperature of 1100° C. to 1200° C. in a reducing atmosphere (0.1% $H_2$/99.9% $N_2$, $H_2O/H_2/N_2$ atmosphere), and then reoxidation was carried out for 3 hours in a nitrogen ($N_2$) atmosphere at 1000° C. for heat treatment.

Then, the sintered ceramic body was passed through a termination process and electrode sintering with a copper (Cu) paste to complete an external electrode.

Moreover, the dielectric layer 111 and the first and second internal electrodes 121 and 122 inside the ceramic body 110 were manufactured to have a thickness of 0.4 μm or less after sintering.

Comparative Example 1

In the case of a Comparative Example 1, ZnO was not added, as a conventional case, and other manufacturing processes were the same as in the above-described Example.

Comparative Example 2

In the case of Comparative 2, ZnO was added to the dielectric slurry to adjust the content of the ZnO to be 0.4 mol % with respect to 100 mol % of the base material main component, and other manufacturing processes were the same as those in the above-described embodiment.

A test with respect to dielectric loss (that is, a dissipation factor (DF)) and an effective capacity change rate at each of 1V DC and 3V DC was performed on Examples 1 and 2 and Comparative Examples 1 and 2, a prototype multilayer ceramic capacitor (that is, a proto-type MLCC) specimen, competed as described above.

Table 1, described below, illustrates a dielectric loss (that is, a dissipation factor (DF)) of the prototype multilayer ceramic capacitor (that is, proto-type MLCC) chip and an effective capacity change rate at 1V DC and 3V DC according to Experimental Example (Examples 1 and 2 and Comparative Examples 1 and 2).

TABLE 1

| Experimental Example | DF (%) | 1 V DC effective capacity change rate (%) | 3 V DC effective capacity change rate (%) |
|---|---|---|---|
| Comparative Example 1 | 7.8 | −13.3 | −52.7 |
| Example 1 | 4.4 | −8.8 | −43.1 |
| Example 2 | 4.3 | −7.9 | −43.5 |
| Comparative Example 2 | 4.8 | −6.4 | −43.9 |

Referring to Table 1, as a conventional case, in the case of Comparative Example 1, to which zinc oxide (ZnO) was not added, there was a problem in a dielectric loss (that is, a dissipation factor (DF)), and there was a problem in which an effective capacity change rate at each of 1V DC and 3V DC was high.

On the other hand, in Embodiments 1 and 2, the content of ZnO was satisfied with 0.1 mol % or more and less than 0.4 mol % with respect to 100 mol % of the base material main component. In this case, it is confirmed that a dielectric loss (that is, a dissipation factor (DF)) was reduced and an effective capacity change rate was reduced under a DC electric field.

Here, in Comparative Example 2, ZnO was added to allow the content of the ZnO to be 0.4 mol % with respect to 100 mol % of the base material main component. A dielectric loss (that is, a dissipation factor (DF)) was reduced, and an effective capacity change rate was reduced under a DC electric field. However, a phenomenon of reliability degradation was significant.

Figure 3:
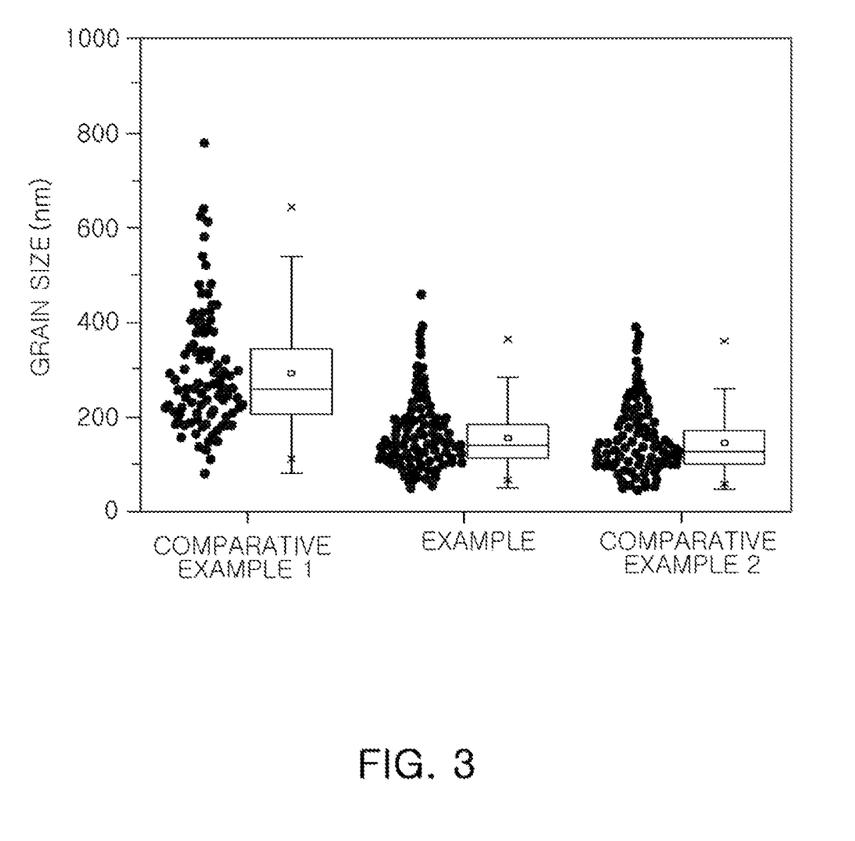
FIG. 3 is a graph illustrating a dielectric grain size of an Example and a Comparative Examples according to an embodiment.

FIG. 3 is a graph illustrating a dielectric grain size of an Example and a Comparative Examples according to an embodiment.

Referring to FIG. 3, as a conventional case, in the case of Comparative Example 1 to which ZnO was not added to the dielectric ceramic composition, sintering was performed at 1,140° C., but it is confirmed that there was no grain growth inhibition effect.

On the other hand, in the case of Example 1, the content of ZnO in the dielectric ceramic composition was 0.1 mol % with respect to 100 mol % of the base material main component, and sintering was performed at a sintering temperature of 1,120° C., which was lowered by 20° C., but it is confirmed that densification appeared and a grain growth inhibition effect was significant.

Meanwhile, in the case of Comparative Example 2, the content of ZnO in the dielectric ceramic composition was 0.4 mol % with respect to 100 mol % of the base material main component, and sintering was performed at a sintering temperature of 1,120° C., which was lowered by 20° C., but it is confirmed that densification appeared and a grain growth inhibition effect was significant. However, as will be described later, there was a problem in reliability.

Figure 4A:
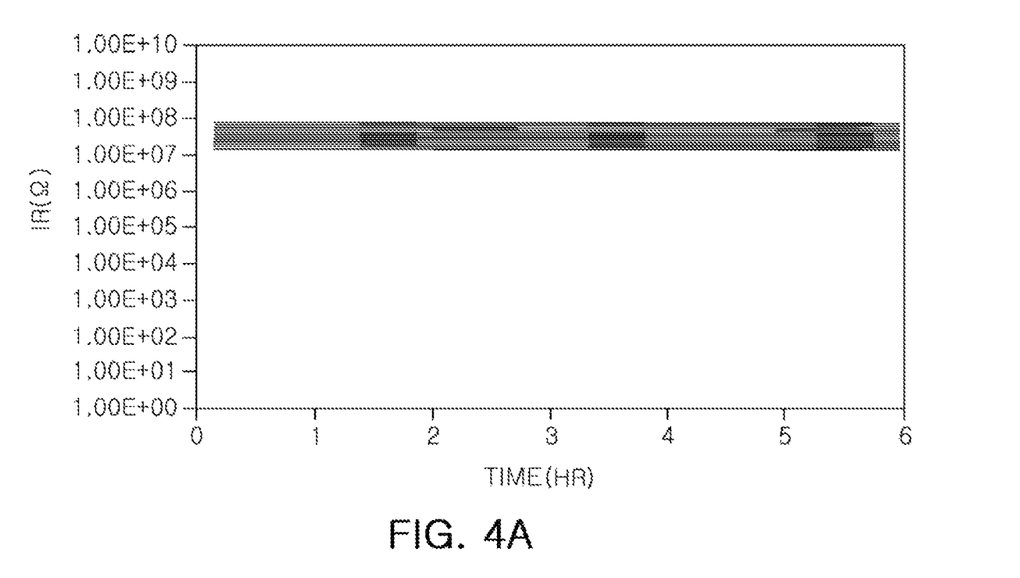
FIGS. 4A and 4B are severe reliability evaluation result graphs of an Example and a Comparative Example according to an embodiment.
Figure 4B:
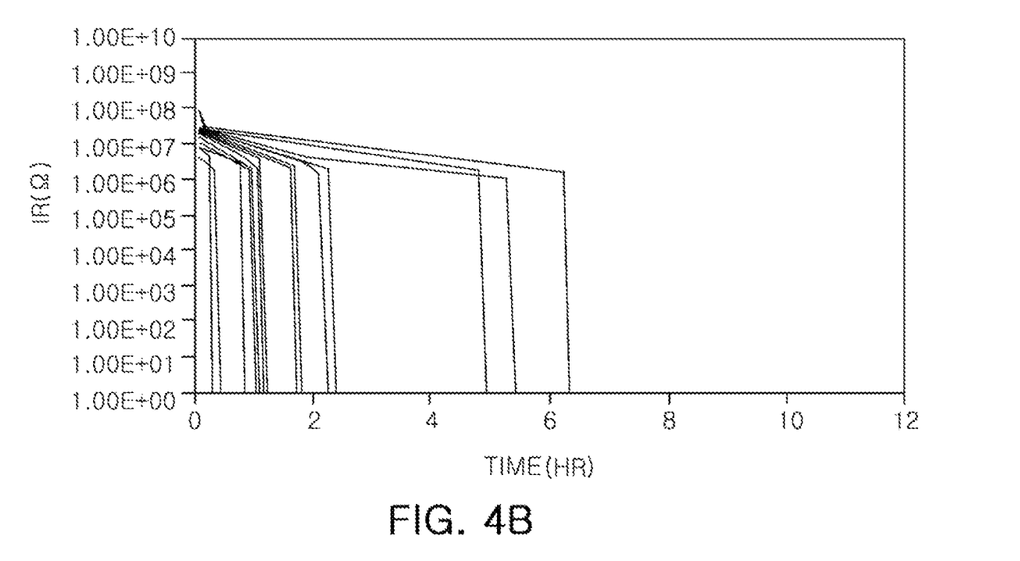

FIGS. 4A and 4B are severe reliability evaluation result graphs of an Example and a Comparative Example according to an embodiment.

FIG. 4A shows the result of Example 1, and the content of ZnO in the dielectric ceramic composition was 0.1 mol % with respect to 100 mol % of the base material main component. In this case, it can be seen that there was no defect in the severe reliability evaluation, and therefore, reliability was excellent.

FIG. 4B shows the result of Comparative Example 2, and the content of ZnO in the dielectric ceramic composition was 0.4 mol % with respect to 100 mol % of the base material main component. In this case, a large number of defects were found in the severe reliability evaluation, and therefore it can be seen that reliability was deteriorated.

As set forth above, according to an embodiment in the present disclosure, a dielectric ceramic composition for use in a dielectric layer formed in a ceramic body includes zinc oxide (ZnO) as a subcomponent, and the content thereof is controlled. Thus, grain growth inhibition and low temperature densification may be implemented. Thus, an effective capacity change rate may be reduced and reliability may be improved under a DC electric field.

While exemplary embodiments have been shown and described above, it will be apparent to those skilled in the art that modifications and variations could be made without departing from the scope of the present invention as defined by the appended claims.

What is claimed is:

1. A multilayer ceramic capacitor, comprising:
   a ceramic body including a dielectric layer, and a first internal electrode and a second internal electrode disposed to oppose each other with the dielectric layer interposed therebetween; and
   a first external electrode and a second external electrode disposed on an exterior of the ceramic body, wherein the first external electrode is electrically connected to the first internal electrode, and the second external electrode is electrically connected to the second internal electrode,
   wherein the dielectric layer includes a dielectric grain including a dielectric ceramic composition, the dielectric ceramic composition includes a barium titanate ($BaTiO_3$)-based base material main component and a subcomponent, the subcomponent including an oxide which includes zinc as a first subcomponent, and a thickness of the dielectric layer is 0.4 μm or less, and the oxide which includes zinc is segregated in a grain boundary.

2. The multilayer ceramic capacitor of claim 1, wherein the subcomponent includes magnesium (Mg) as a second subcomponent, and a total content of the Mg and the oxide which includes zinc is less than 0.8 mol % with respect to 100 mol % of the barium titanate-based base material main component.

3. The dielectric ceramic composition of claim 1, wherein the dielectric ceramic composition includes 0.1 mol % to 2.0 mol %, inclusive, of the first subcomponent further including one or more oxides including at least one element selected from the group consisting of manganese (Mn), vanadium (V), chromium (Cr), iron (Fe), nickel (Ni), cobalt (Co), and copper (Cu), and/or one or more carbonates including at least one element selected from the group consisting of Mn, V, Cr, Fe, Ni, Co, and Cu, with respect to 100 mol % of the barium titanate-based base material main component.

4. The dielectric ceramic composition of claim 1, wherein the dielectric ceramic composition includes 0.2 mol % to 0.7 mol %, inclusive, of a second subcomponent including an oxide and/or a carbonate including a fixed-valence acceptor element magnesium (Mg) with respect to 100 mol % of the barium titanate-based base material main component.

5. The dielectric ceramic composition of claim 1, wherein the dielectric ceramic composition includes 0.001 mol % to 0.5 mol %, inclusive, of a third subcomponent including one or more oxides including at least one of silicon (Si) or aluminum (Al), or a glass compound including Si, with respect to 100 mol % of the barium titanate-based base material main component.

6. The dielectric ceramic composition of claim 1, wherein the dielectric ceramic composition includes 0.001 mol % to 4.0 mol %, inclusive, of a fourth subcomponent including one or more oxides including at least one element selected from the group consisting of dysprosium (Dy), yttrium (Y), holmium (Ho), erbium (Er), cerium (Ce), neodymium (Nd), promethium (Pm), europium (Eu), gadolinium (Gd), thulium (Tm), ytterbium (Yb), lutetium (Lu), and samarium (Sm), and/or one or more carbonates including at least one element selected from the group consisting of Dy, Y, Ho, Er, Ce, Nd, Pm, Eu, Gd, Tm, Yb, Lu and Sm, with respect to 100 mol % of the barium titanate-based base material main component.

7. The dielectric ceramic composition of claim 1, wherein La is disposed at a boundary of the dielectric grain.

8. The dielectric ceramic composition of claim 1, wherein the thicknesses of the first and second internal electrodes are 0.4 μm or less.

9. A multilayer ceramic capacitor, comprising:
a ceramic body including a dielectric layer, and a first internal electrode and a second internal electrode disposed to oppose each other with the dielectric layer interposed therebetween; and
a first external electrode and a second external electrode disposed on an exterior of the ceramic body, wherein the first external electrode is electrically connected to the first internal electrode, and the second external electrode is electrically connected to the second internal electrode,
wherein the dielectric layer includes a dielectric grain including a dielectric ceramic composition,
the dielectric ceramic composition includes a barium titanate ($BaTiO_3$)-based base material main component and a subcomponent, the subcomponent including an oxide which includes zinc as a first subcomponent, and a thickness of the first internal electrode and a second internal electrode is 0.4 μm or less, and
the oxide which includes zinc is segregated in a grain boundary.

10. The multilayer ceramic capacitor of claim 9, wherein a content of the oxide which includes zinc in the dielectric ceramic composition is 0.1 mol % or more and less than 0.4 mol % with respect to 100 mol % of the barium titanate-based base material main component.

11. The multilayer ceramic capacitor of claim 9, wherein the subcomponent includes magnesium (Mg) as a second subcomponent, and a total content of the Mg and the oxide which includes zinc is less than 0.8 mol % with respect to 100 mol % of the barium titanate-based base material main component.

12. The dielectric ceramic composition of claim 9, wherein the dielectric ceramic composition includes 0.1 mol % to 2.0 mol %, inclusive, of the first subcomponent further including one or more oxides including at least one element selected from the group consisting of manganese (Mn), vanadium (V), chromium (Cr), iron (Fe), nickel (Ni), cobalt (Co), and copper (Cu), and/or one or more carbonates including at least one element selected from the group consisting of Mn, V, Cr, Fe, Ni, Co, and Cu, with respect to 100 mol % of the barium titanate-based base material main component.

13. The dielectric ceramic composition of claim 9, wherein the dielectric ceramic composition includes 0.2 mol % to 0.7 mol %, inclusive, of a second subcomponent including an oxide and/or a carbonate including a fixed-valence acceptor element magnesium (Mg) with respect to 100 mol % of the barium titanate-based base material main component.

14. The dielectric ceramic composition of claim 9, wherein the dielectric ceramic composition includes 0.001 mol % to 0.5 mol %, inclusive, of a third subcomponent including one or more oxides including at least one of silicon (Si) or aluminum (Al), or a glass compound including Si, with respect to 100 mol % of the barium titanate-based base material main component.

15. The dielectric ceramic composition of claim 9, wherein the dielectric ceramic composition includes 0.001 mol % to 4.0 mol %, inclusive, of a fourth subcomponent including one or more oxides including at least one element selected from the group consisting of dysprosium (Dy), yttrium (Y), holmium (Ho), erbium (Er), cerium (Ce), neodymium (Nd), promethium (Pm), europium (Eu), gadolinium (Gd), thulium (Tm), ytterbium (Yb), lutetium (Lu), and samarium (Sm), and/or one or more carbonates including at least one element selected from the group consisting of Dy, Y, Ho, Er, Ce, Nd, Pm, Eu, Gd, Tm, Yb, Lu and Sm, with respect to 100 mol % of the barium titanate-based base material main component.

16. The dielectric ceramic composition of claim 9, wherein La is disposed at a boundary of the dielectric grain.

* * * * *